June 4, 1940.　　D. M. SOLENBERGER　　2,203,208
PISTON SEALING DEVICE
Filed Oct. 28, 1938　　2 Sheets-Sheet 1

INVENTOR.
DEAN M. SOLENBERGER
BY
Richey + Watts
ATTORNEYS

June 4, 1940.    D. M. SOLENBERGER    2,203,208
PISTON SEALING DEVICE
Filed Oct. 28, 1939    2 Sheets-Sheet 2

INVENTOR.
DEAN M. SOLENBERGER
BY Richey & Watts
ATTORNEYS

Patented June 4, 1940

2,203,208

UNITED STATES PATENT OFFICE 2,203,208

PISTON SEALING DEVICE

Dean M. Solenberger, Cleveland, Ohio, assignor to Simplex Products Corporation, Cleveland, Ohio Application October 28, 1938, Serial No. 237,519

2 Claims. (Cl. 309—45)

This invention relates to piston sealing devices and more particularly to an improved piston packing for internal combustion engines and the like.

Piston packings comprising a piston ring adapted to engage the cylinder wall and an expander spring disposed between the inner surface of the ring and the bottom of the ring groove in the piston are in common and widespread use. The function of the expander spring is to exert a distributed radial pressure outwardly against the sealing ring to cause it to engage the cylinder wall with the pressure necessary to provide an effective seal. A common form of expander spring comprises a piece of corrugated flat spring steel wire having humps which engage the piston ring and intermediate portions which engage the bottom of the ring groove. As the usual piston ring of the type used in automotive vehicle engines is from $\frac{1}{8}''$ to $\frac{3}{16}''$ in axial thickness (the term "axial thickness" meaning the thickness in a direction parallel to the longitudinal axis of the cylinder and the term "radial width" meaning the width on a line extending radially from the center line of the piston) and has a correspondingly large total surface area engaging the cylinder wall, the humps of the expander spring must bear with considerable force against the inner surface of the ring to create the necessary unit pressure of the ring against the cylinder wall to seal the gas and oil and prevent blow-by.

In the operation of the engine the piston ring "breathes" or works in the ring groove with consequent rubbing action on the humps of the expanders. With the old type of rings which fill the entire groove this results in a wearing of the expander at the humps over substantially its entire axial dimension and such wear may seriously weaken and reduce the spring force of the expander. In numerous instances the expanders have failed completely due to let down or breakage from wear at the humps.

Piston ring assemblies have also been developed in which a relatively thick cast iron center section is sandwiched between two thin steel sections or laminae. However, as the expander spring must be made considerably narrower than the width of the ring groove in order that it may have free action therein, difficulty has been experienced with the thin laminae becoming jammed between the edge of the expander and a side wall of the ring groove, thus causing the entire ring assembly to fail.

It is among the objects of my invention to provide an extremely simple, efficient and long-lived piston sealing device which is particularly susceptible to economical manufacture and easy installation and by which wear is reduced to a minimum and efficiency maintained under all kinds of operating conditions. Other objects of my invention include the provision of a piston sealing device of the type described in which jamming and failure of the expander spring is prevented; the provision of a piston sealing device of the expander type in which wear on the expander is greatly reduced and let down and failure of the expander eliminated; the provision of a piston sealing device which is practically entirely free from the often encountered difficulty of sticking and failure due to carbon forming and freezing the ring in the groove; the provision of a piston sealing device in which a high unit pressure of the sealing element against the cylinder wall may be provided with a very low total pressure or drag; and the provision of a sealing device which will rapidly reach a good seat against the cylinder wall and then wear for extremely long periods, regardless of the operating conditions of the engine.

The above and other objects of my invention will appear from the following description of several embodiments thereof, reference being had to the accompanying drawings, in which Figure 1 is a fragmentary enlarged cross-sectional view of a portion of a cylinder and piston showing a single ring groove of the piston with one form of my invention installed therein.

Figure 1:
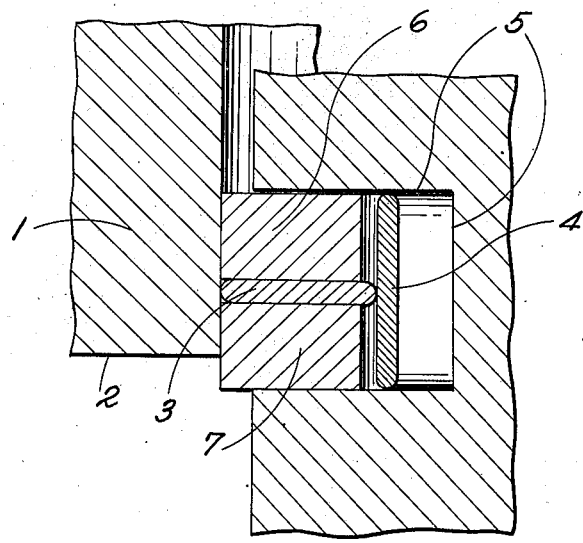

In Figure 1 the cylinder wall is shown at 1 and the engine of which this wall forms a part is of the type in which the bottom edge 2 of the cylinder wall stops short of the bottom position of the lower wall of the bottom ring groove when the piston is at the low point of its stroke. Such position of the piston is illustrated in Figure 1 and, with rings having thin laminae at the top and bottom of the ring groove, difficulty may at times be experienced in this type of cylinder due to the bottom lamina slipping out and becoming caught under the bottom edge 2 of the cylinder when the piston is at its low point. Breakage of the ring or piston or both results when this occurs. All of the embodiments of my invention are entirely free from this defect because of the approximately central location of the sealing elements in the ring groove, as will appear later.

The sealing device assembly shown in Figure 1 includes a single, thin, split ring section 3, preferably having rounder inner and outer edges, the outer edge engaging the cylinder and the inner edge engaging the humps 4 of the expander spring. This ring 3 is located in the center of the ring groove 5 and is supported and held in position by suitable dummy or spacer split ring sections 6 and 7. As is clearly seen in the drawings, the spacers 6 and 7 are of relatively great axial depth but of narrower radial width than the sealing ring section 3 and serve primarily to locate and support the section 3. The expander spring 4 fits freely in the ring groove 5 and relatively large clearance between the sides of the ring groove and the edges of the expander may be provided to prevent sticking of the expander and without danger of jamming the outside ring elements between the expander and the groove walls. The narrow outer peripheral surface of the ring section 3 may be caused to engage the cylinder wall with a comparatively high unit pressure by a relatively light expander spring 4. As a low total pressure is required to be exerted by the expander the expander will not be overloaded and will operate at all times well within its safe load limits. The life of expanders used in my invention is, therefore, greatly prolonged. The outer edge of the section 3 is preferably rounded as shown or otherwise reduced in order to facilitate quick seating thereof.

By locating the section 3 in the center of the ring groove, particularly insofar as replacement service in used engines is concerned, any danger of the working parts of the sealing device engaging a previously worn shoulder at the top or bottom of the cylinder is eliminated and, as noted above, all danger of the thin ring section slipping beyond the top or bottom end of the cylinder is prevented.

As the floating spacers 6 and 7 are not borne against by the expander 4 and either have only very light contact with the cylinder or are slightly smaller in diameter than the cylinder, they are free to float or vibrate in the ring groove back and forth over the surface of the ring section 3 and to rotate around the piston. The entire assembly of dummy spacers 6 and 7 and sealing section 3 is preferably made somewhat thinner axially than the width of the ring groove and thus this desirable vibration or floating movement of the spacers is facilitated. Such movement effectively prevents the accumulation of carbonaceous deposits on the surface of the ring groove or the elements 3, 6 and 7, thus preventing sticking of the ring in the groove. The sealing element 3 may be of any suitable material, such as soft low carbon steel, hard high carbon spring steel, non-ferrous metal, cast iron, etc., and the spacer members 6 and 7 may be made of similar materials, as desired.

I have successfully operated sealing devices of the type illustrated in Figure 1 in a cylinder having a bore of 3 1/16" with a piston having a ring groove 5/32" wide and 5/32" deep. With this assembly expanders made of spring steel approximately .012" thick and having eight humps engaging the sealing ring are disposed in each ring groove with a total clearance of .003" to .010" from the sides of the groove. The single thin sealing sections may be from approximately .090" to .120" in radial width and from .015" to .030" in axial thickness and are preferably coiled to a diameter of from about standard to .060" greater than the bore of the cylinder. The dummy or spacer sections which hold the ring sections in the center of the ring groove have a radial width of from about .015" to .030" less than the radial width of the ring sections, and have an outside diameter of from approximately .015" less than the cylinder bore to about .060" over the cylinder bore. The spacer sections are of such axial thickness that a total axial clearance of the assembled sealing device in the ring groove of from .003" to .010" is provided. With such an assembly neither the center ring section 3 nor the dummy sections 6 and 7 have great inherent pressure producing characteristics against the cylinder wall because they are formed to a diameter which at most is only very slightly greater than the cylinder bore. As the spacer sections 6 and 7 are shallower than the ring section 3 (that is, smaller in radial width), they are free to vibrate and move radially and circumferentially in the ring groove to prevent the harmful accumulation of carbon on the parts of the ring assembly. There is no danger of jamming of the thin sealing section 3 between the expander spring and the ring groove side wall and thus the expander may be provided with sufficient clearance from the side walls to permit it to act freely in the groove even with some carbon present in the groove. The above given dimensions are typical and have been found to be entirely practical and successful, but are not to be considered as limiting in any way as they may be varied substantially to fit different sizes of cylinders, ring grooves, etc.

Figures 2, 3:
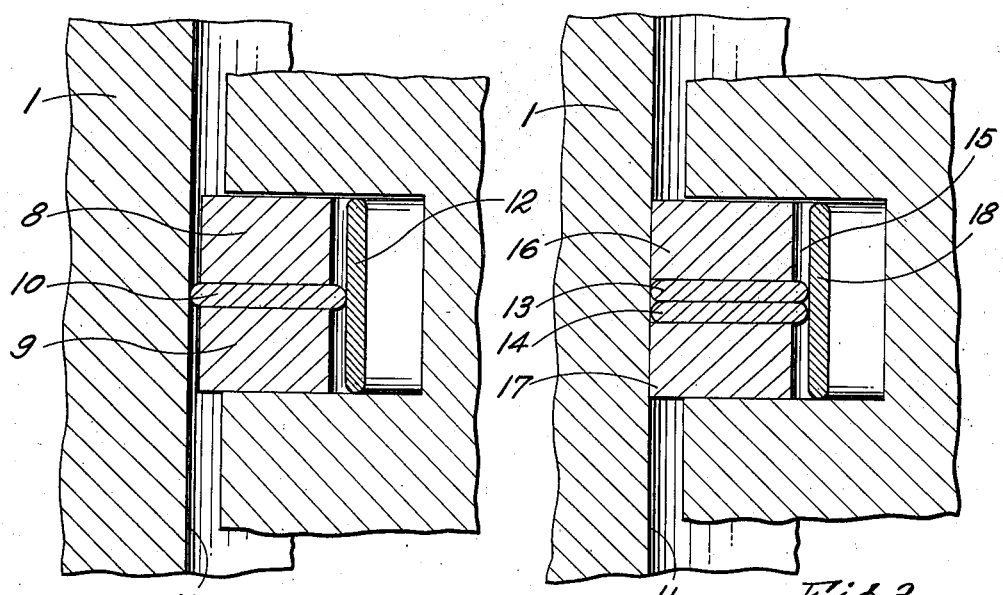
Figure 2 is a view similar to Figure 1 but illustrating a modified form of my invention.
Figure 3 is a view similar to Figure 1 but illustrating a third form of my invention in which two centered thin ring sections are employed.
Figure 4:
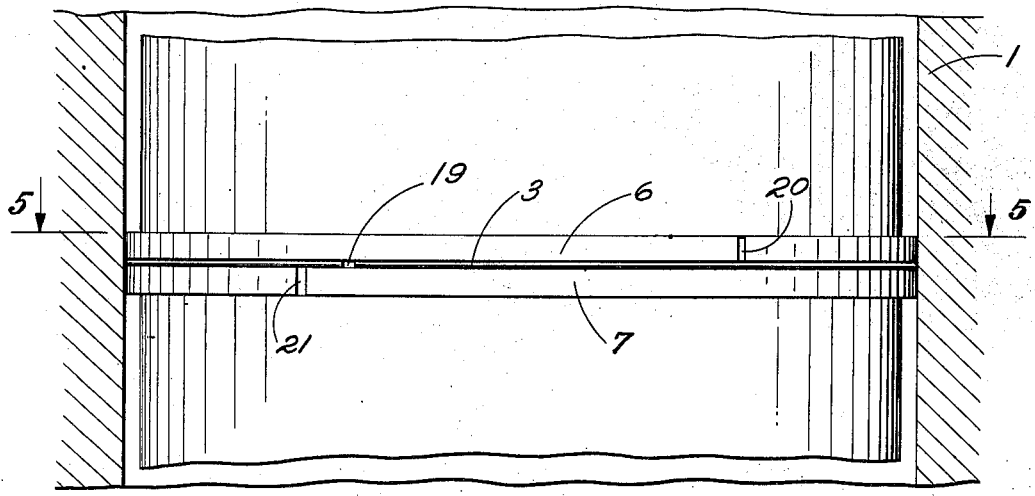
Figure 4 is a fragmentary side elevation of a piston and the cylinder walls, the piston having a sealing ring assembly generally similar to that shown in Figure 1 installed in one of the ring grooves.

Figure 2 shows a sealing ring assembly which is quite similar to that shown in Figure 1. However, in Figure 2 the dummy or spacer sections 8 and 9 are coiled to a diameter smaller than the cylinder bore so that they do not engage the cylinder bore throughout their length. Of course, they may move sideways in the ring groove during operation of the engine and strike against one side of the cylinder wall or the other but no drag will be caused by the spacers. The sealing ring section 10 of Figure 2 is forced into engagement with the cylinder wall 11 by the expander spring 12.

In Figure 3 I have illustrated a modified embodiment of my invention in which two thin sealing ring sections or laminae 13 and 14, of equal radial width, are approximately centrally disposed in the ring groove 15. The expander 18 exerts the desired pressure against the inner edges of the laminae 13 and 14 to cause them properly to engage the cylinder wall and to center the piston in the cylinder. Although the spacer sections are shown engaging the cylinder wall as they do in Figure 1 they may be made smaller than the cylinder diameter as shown in Figure 2. In each instance, however, the spacers support and guide the thin sealing sections out to a point very closely adjacent to the cylinder wall. The same general dimensions and clearances may be provided in the arrangement shown in Figure 3 as noted above in describing Figure 1. However, if desired, the individual sections or laminae 13 and 14 may be made thinner in axial dimension than where a single centrally located ring section is used.

Figure 5:
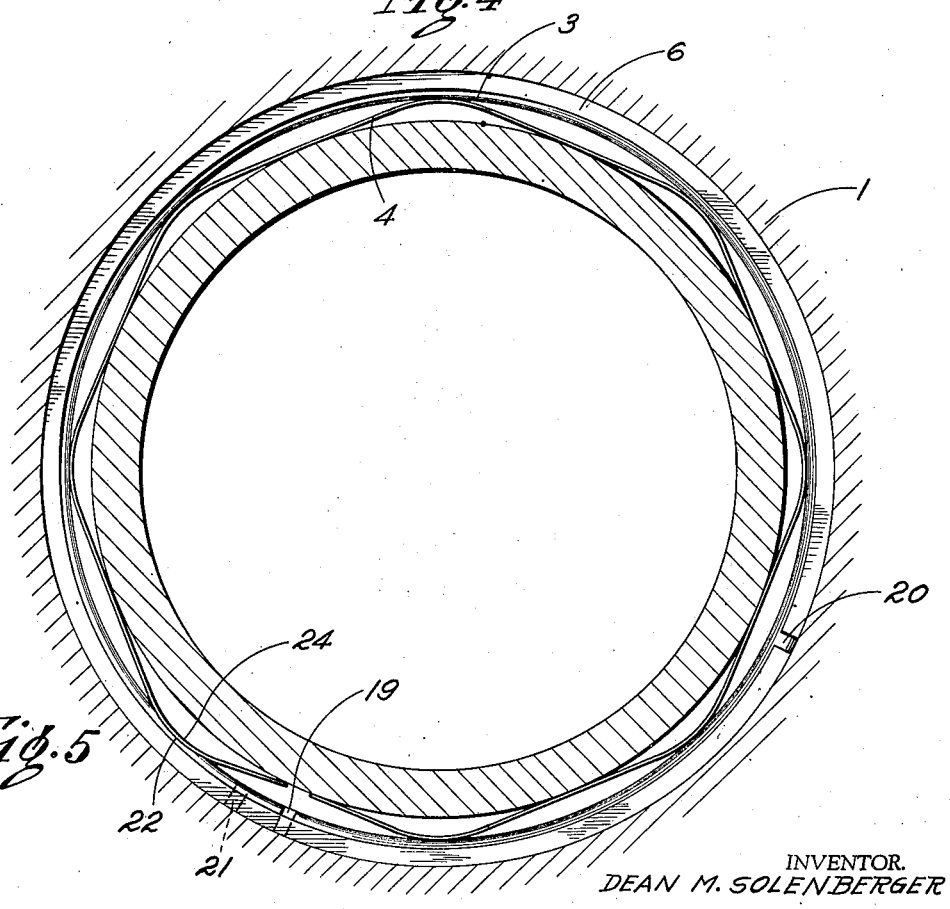
Figure 5 is a horizontal cross-sectional view taken on line 5—5 of Figure 4.

The arrangement of the ring elements making up my improved sealing device is shown in Figure 5 which is an elevational view of one piston ring groove. The assembly of Figure 1 is illustrated and like reference characters indicate the like parts. The sealing section 3 is split as shown at 19 and each of the top and bottom spacer ring sections 6 and 7 are split at 20 and 21 respectively. The sectional plan view, Figure 5, also shows the sealing device assembly of Figure 1. The sealing section 3 is shown extending radially inwardly from the inner edge of the spacer sections 6 and 7. A recess 22 is formed on the inner edge of the sealing section 3 and this recess engages one of the hump portions 24 of the expander 4. Relative rotation of the expander and sealing ring is thus prevented. It will be understood that other means, such as a lug projecting from the inner edge of the sealing ring, may be utilized for preventing such rotation of the sealing ring.

In all of the constructions described above and illustrated in the accompanying drawings, the ring sections which have sealing engagement with the cylinder wall are approximately centrally disposed relative to the ring groove and to the width of the expander spring which supplies the necessary distributed radial pressure. As such centrally disposed ring sections engage the humps of the expander only at a relatively small area in the center of each hump, any wear which takes place due to such engagement will not seriously affect the spring force which is exerted by the expander and all danger of wearing the expander to a point where breakage or let-down takes place is eliminated. Even though the centrally located ring sections might, in extreme cases, wear entirely through the expander humps, there would still be sufficient metal on either side of the point of contact of the humps with the ring sections to furnish an effective outward pressure of the ring sections against the cylinder walls. Although I have found my sealing rings to be particularly effective as oil rings they may also be used as compression rings and they may, of course, be used in one or more of the ring grooves of a piston, as deemed advisable.

A serious source of loss of power in an internal combustion engine is the stiffness caused by piston drag. This is reduced to a very low value by the employment of my sealing devices in which, although the unit pressure of the sealing rings against the cylinder wall is maintained sufficiently high to hold compression and maintain the proper oil film, the total pressure is much lower than where full width ring assemblies are employed. As referred to before, a wide range of metals may be utilized for my sealing and spacer ring sections. I have found that, under engine operating conditions where abrasion due to dirty oil and the like is a serious factor, the sealing section may advantageously be made of soft low carbon steel. However, under engine operating conditions where erosion due to blow-by and rubbing of the ring against the cylinder wall is the main factor to contend with, my centrally disposed thin and flexible sealing section can advantageously be made of a hardened spring steel. Preferably the rounded or reduced outer edge of the hard steel sealing section is polished. Even when hard spring steel is utilized in my sealing ring construction an accurate and prompt seating of the ring in the cylinder is obtained because the sealing section is comparatively thin in a radial direction and is thus flexible and readily conformed to the contour of the cylinder wall under the influence of the expander spring. As the sealing sections themselves preferably have substantially no inherent wall pressure producing characteristics an evenly distributed pressure is applied by the expander and thus the danger of scoring due to excessive pressure at one place is greatly reduced.

Although I have described in considerable detail several embodiments of my invention, it will be understood by those skilled in the art that variations and modifications may be made in the arrangement and proportions of the parts making up my improved sealing device without departing from the spirit of my invention. I do not, therefore, wish to be limited to the particular forms herein shown and described but claim as my invention all embodiments thereof coming within the scope of the appended claims.

I claim:

1. A piston sealing device including in combination a pair of contacting thin sealing ring sections each having an axial thickness of from .015" to .030", a pair of split radially floating dummy or spacer sections each having a substantially equal axial thickness greater than the combined axial thickness of said sealing ring sections and such that a total axial clearance of the assembled sealing device in its ring groove of from .003" to .010" is provided, both the sealing ring sections and said dummy sections being substantially free from inherent wall pressure producing characteristics, and a corrugated expander spring having an axial dimension equal to or not more than about .025" less than the total axial thickness of the assembled group of ring sections.

2. In a piston sealing device of the type described, a pair of substantially identical split floating spacer ring sections each having an axial thickness of not less than 3/64", a pair of contacting substantially identical, split sealing ring sections each having an axial thickness of between .015" and .030", said sealing ring sections having a radial width greater than the radial width of said spacer ring sections, and a corrugated expander spring having an axial dimension substantially equal to or slightly less than the total axial thickness of said spacer and sealing rings and adapted to exert a distributed outward radial pressure against said sealing ring sections only, said spacer ring sections being positioned to maintain said sealing ring sections substantially centered in a ring groove and in contact with a centrally located portion only of the engaged humps of the expander spring.

DEAN M. SOLENBERGER.